(12) United States Patent
Sala

(10) Patent No.: US 10,422,044 B2
(45) Date of Patent: Sep. 24, 2019

(54) ELECTROCHEMICAL CELL FOR THE ELECTROLYSIS OF LIQUID WATER OR WATER VAPOR, MANUFACTURING PROCESS AND USES

(71) Applicant: Beatrice Sala, Saint Gely du Fesc (FR)

(72) Inventor: Beatrice Sala, Saint Gely du Fesc (FR)

( * ) Notice: Subject to any disclaimer, the term of this patent is extended or adjusted under 35 U.S.C. 154(b) by 83 days.

(21) Appl. No.: 15/300,894

(22) PCT Filed: Apr. 2, 2015

(86) PCT No.: PCT/EP2015/000719
§ 371 (c)(1),
(2) Date: Sep. 30, 2016

(87) PCT Pub. No.: WO2015/149948
PCT Pub. Date: Oct. 8, 2015

(65) Prior Publication Data
US 2017/0016124 A1  Jan. 19, 2017

(30) Foreign Application Priority Data

Apr. 2, 2014 (EP) .................................... 14001226

(51) Int. Cl.
*C25B 1/04* (2006.01)
*C25B 9/10* (2006.01)
(Continued)

(52) U.S. Cl.
CPC .................. *C25B 1/04* (2013.01); *C25B 1/10* (2013.01); *C25B 3/04* (2013.01); *C25B 9/10* (2013.01);
(Continued)

(58) Field of Classification Search
CPC .............. C25B 1/04; C25B 9/10; C25B 13/04
(Continued)

(56) References Cited

U.S. PATENT DOCUMENTS

2008/0261098 A1  10/2008 Lemmon et al.
2010/0196767 A1*  8/2010 Sala .................... B01D 53/228
                                                 429/400
(Continued)

FOREIGN PATENT DOCUMENTS

FR    2 931 168 A1    11/2009

OTHER PUBLICATIONS

International Search Report and Written Opinion dated Aug. 4, 2015 issued in corresponding application No. PCT/EP2015/000719; w/ English partial translation and partial machine translation (18 pages).

*Primary Examiner* — Bryan D. Ripa
(74) *Attorney, Agent, or Firm* — Westerman, Hattori, Daniels & Adrian, LLP

(57) ABSTRACT

An electrochemical cell for the electrolysis of liquid water or water vapor includes a proton-conducting electrolyte (3) made of aluminosilicate, sandwiched between a porous metal anode (2) and a porous electronic conducting cathode (4). Preferably, the porous metal anode (2) is a sintered stainless alloy comprising at least 18% chromium. Also, a method of manufacturing such a cell includes at least:
—manufacturing the proton-conducting aluminosilicate electrolyte (3) and deposition of said electrolyte (3) on the porous metal anode (2) by hydrothermal method, and —depositing the electronic conducting porous cathode (4) on the electrolyte (3) to form the electrochemical cell (1). The electrochemical cell can be used for, amongst other compounds, the reduction of oxidized compounds, such as the oxidized compounds constituted, for example, by carbon dioxide.

21 Claims, 3 Drawing Sheets

Figure 1:
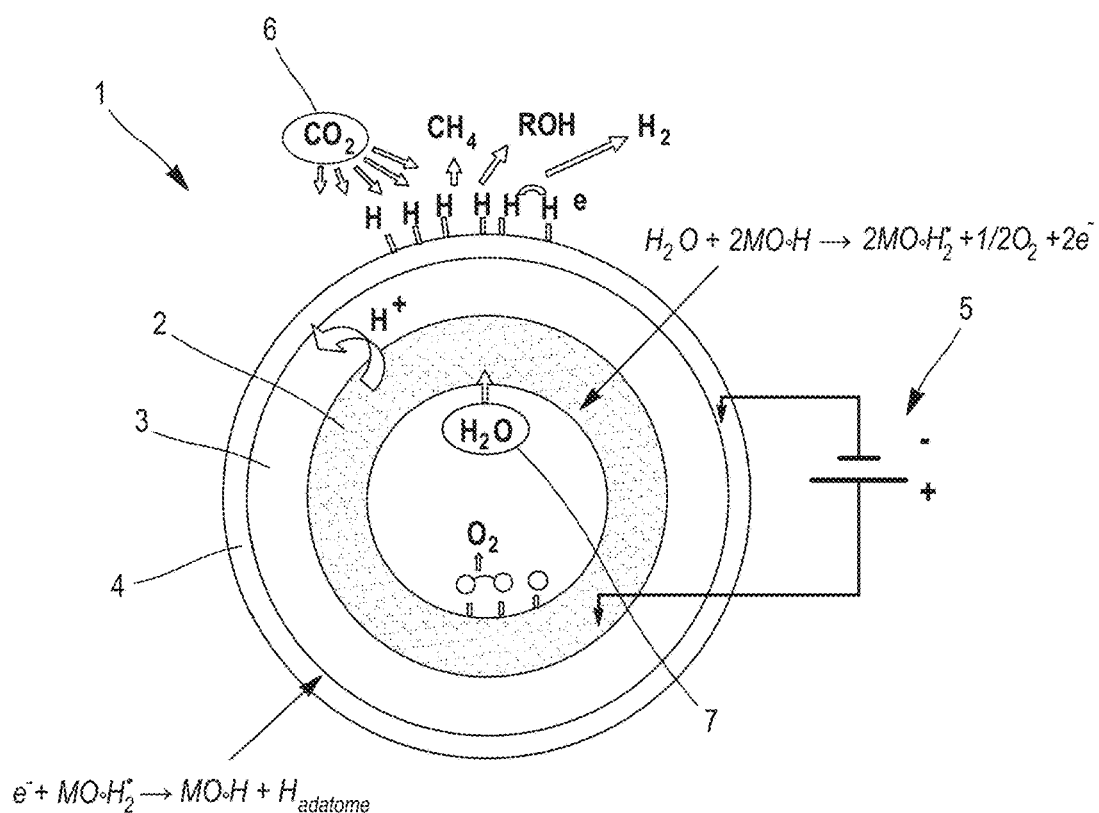

(51) Int. Cl.
  *C25B 13/04* (2006.01)
  *C25B 1/10* (2006.01)
  *C25B 3/04* (2006.01)
  *C25B 11/03* (2006.01)
  *C25D 3/12* (2006.01)
  *C25D 3/38* (2006.01)

(52) U.S. Cl.
  CPC ............ *C25B 11/035* (2013.01); *C25B 13/04* (2013.01); *C25D 3/12* (2013.01); *C25D 3/38* (2013.01); *Y02E 60/366* (2013.01)

(58) Field of Classification Search
  USPC .................................................. 204/252–266
  See application file for complete search history.

(56) References Cited

U.S. PATENT DOCUMENTS

| | | | |
|---|---|---|---|
| 2011/0132770 A1 | 6/2011 | Sala et al. | |
| 2011/0312770 A1* | 12/2011 | Moini | B01L 3/5027 506/39 |
| 2013/0288150 A1 | 10/2013 | Hodges et al. | |

* cited by examiner

ELECTROCHEMICAL CELL FOR THE ELECTROLYSIS OF LIQUID WATER OR WATER VAPOR, MANUFACTURING PROCESS AND USES

The invention focuses on an electrochemical cell for the electrolysis of liquid water or water vapor. The invention also concerns a manufacturing process for such a cell as well as the possible uses of this cell.

Electrochemical cells used in particular for electrolysers or fuel cells at medium and high temperatures, generally comprise a solid electrolyte sandwiched between an anode and a cathode.

Known solid electrolytes are produced using oxides or hydroxides which, at the operational temperature of the electrolyser, are in the form of a ceramic made up of grains which consist of a more or less crystallized crystal lattice capable of facilitating charge migration under the effect of an electric field, the charges of which are usually electron vacancies or ions like protons. In order to do this, the electrolytes can be more or less doped.

There are four known types of electrolysers: electrolysers using a liquid electrolyte (potash) operating between 80 and 160° C., solid polymeric electrolyte proton-conducting electrolysers operating between 80 and 100° C., solid ceramic electrolyte anion-conducting electrolysers in which the electrolyte is often zirconia stabilized with yttrium and which operate between 700 and 900° C. and solid electrolyte ceramic perovskite proton-conducting electrolysers operating between 500 and 650° C.

We know that the electrolysis of water allows the production of hydrogen which can ensure the reduction of oxidized compounds such as carbon dioxide.

The hydrogen synthesis can be carried out using an electrolyser which includes the means for introducing the water vapor under pressure on the anode side and the means for introducing gas under pressure on the cathode side.

For this purpose, the FR2931168 publication describes an electrochemical cell, the electrolyte of which is made up of a proton-conducting ceramic membrane, particularly doped perovskite material.

The use of such a membrane requires special adaptation of the materials constituting the electrodes. In fact the use of ceramics may cause mechanical fragility of the cell due to differences in the thermal expansion coefficient between the ceramic and the electrodes.

That is why the FR 2931168 publication electrodes are made of cermets, which is a mixture of ceramic and metal or electron conducting ceramic. However the assembly of the electrode/electrolyte/electrode is difficult because of the need to adjust the amount of metal with respect to the ceramic powder while maintaining sufficient surface conductivity. In addition, the differences in the coefficient of expansion cause the formation of cracks after sintering. Moreover, these joints need to be soldered to the body of the electrolyser to separate the anode and cathode compartments, this soldering is difficult and expensive. Finally, the configuration of the FR2931168 publication cell can only be flat which excludes the use of this cell for applications requiring a particular geometric adaptation.

In this context, the present invention provides an electrochemical cell for the reduction of carbon dioxide, which in particular, overcomes the aforementioned disadvantages.

The present invention also provides an electrochemical cell in a modular geometry.

Finally, the present invention provides a method of manufacturing such a cell that is simple and inexpensive.

For this purpose, the electrochemical cell of the invention comprises a proton-conducting inorganic electrolyte made up of aluminosilicates, sandwiched between a porous metal anode and a porous electron conducting cathode.

The electrochemical cell of the invention may also include the following optional features considered separately or in any possible technical combination:
  the porous metal anode is a sintered stainless alloy containing at least 18% of chromium.
  the sintered stainless alloy comprises nickel and/or cobalt and/or iron.
  the cell includes a diffusion layer of metal elements constituting the porous metal anode in the aluminosilicate electrolyte resulting from complexing of oxycarbonated compounds such as formaldehyde, ethanol and carboxylic acids.
  the porous electron conducting cathode is produced using transition metals or metals selected from the Groups IVB, VB, VIB, VIIB, VIIIB, IB, IIB, and their alloys.
  the porous electron conducting cathode contains palladium.
  the porous electron conducting cathode is produced using carbonaceous compounds, such as graphene, carbon nanotubes, or a coupling of carbon-containing compounds with at least one of the transition metals or of the metals selected from the Groups IVB, VB, VIB, VIIB, VIIIB, IB, IIB, and their alloys.
  aluminosilicates are in the form of silicates such as dickite from the kaolinite group and/or clinochlore from the chlorite group, and/or zeolites.
  the cell is tubular in configuration.

The invention also focuses on the manufacturing process of the cell described above which is essentially characterized by the fact that it comprises at least the following steps:
  manufacture of proton-conducting aluminosilicate electrolyte and hydrothermal deposit of said electrolyte on the metallic porous anode, and
  the deposit of the electrically conductive porous cathode onto the electrolyte to form the electrochemical cell.

The manufacturing process of the invention may also include the following optional features either considered separately or in any possible technical combination:
  the manufacturing stage of the electrolyte and the deposit of this electrolyte on the anode is carried out in an autoclave at a pressure of 1 to 100 bars and includes the following steps:
  a mixture of powders containing at least silica and alumina,
  the introduction of an aqueous solution in the autoclave, the solution being basic in character with a pH between 8 and 10 as a result of the addition of basic elements such as ammonia, ethanol amine or morpholine,
  the introduction of a sintered stainless alloy anode in the autoclave,
  the introduction of a noble metal cathode,
  an increase in autoclave temperature,
  polarization of the anode and the noble metal cathode, which results in the dissolution of the powders and the deposit of these powders on the anode accelerated by the polarization.
  additives selected from alkaline metal salts and/or alkaline earth compounds are added to the mixture of silica and alumina, as well as oxycarbonated compounds such as formaldehyde, ethanol and/or carboxylic acids.

the temperature of the autoclave is increased until it reaches between 300° C. and 400° C. and is maintained at that temperature for a period of between 1 and 5000 hours.

the deposit of the porous electron conducting cathode is performed on the electrolyte which has been previously physically deposited on the anode, either by spraying or coating, electroplating and/or by chemical deposit:

of transition metals or metals selected from the Groups IVB, VB, VIB, VIIB, VIIIB, IB, IIB, and their alloys, followed by an electrolytic or chemical deposit of copper.

carbon compounds such as graphene, for example by coating with graphene oxide which is subsequently, chemically, electrochemically or physically reduced, carbon nanotubes, or a coupling of carbon-containing compounds with at least one transition metal or alloy metals selected from the groups IVB, VB, VIB, VIIB, VIIIB, IB, IIB and their alloys.

The invention also relates to the use of the previously described cell for the reduction of oxidized compounds, such as carbon dioxide by reactive chemical species formed as a result of the electrolysis of water, the reduction of which is carried out in the cathode compartment at temperatures between 100 and 400° C., for the production of hydrogen in the cathode compartment and/or for the oxidation of reduced compounds in the anode compartment.

Figure 2:
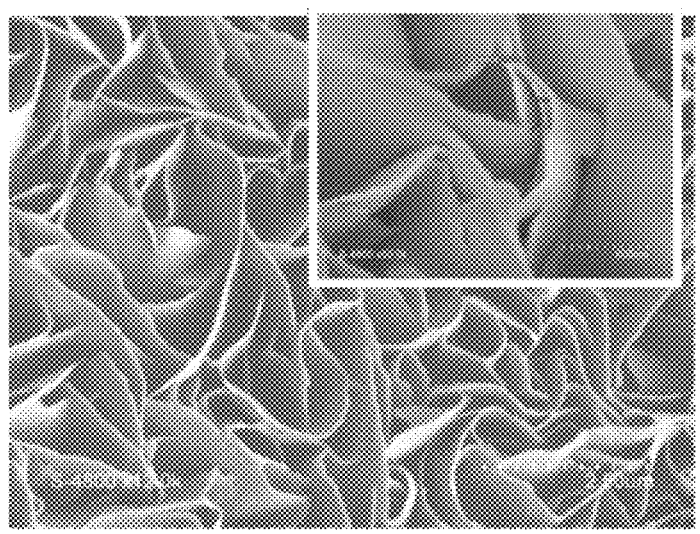
Figure 3:
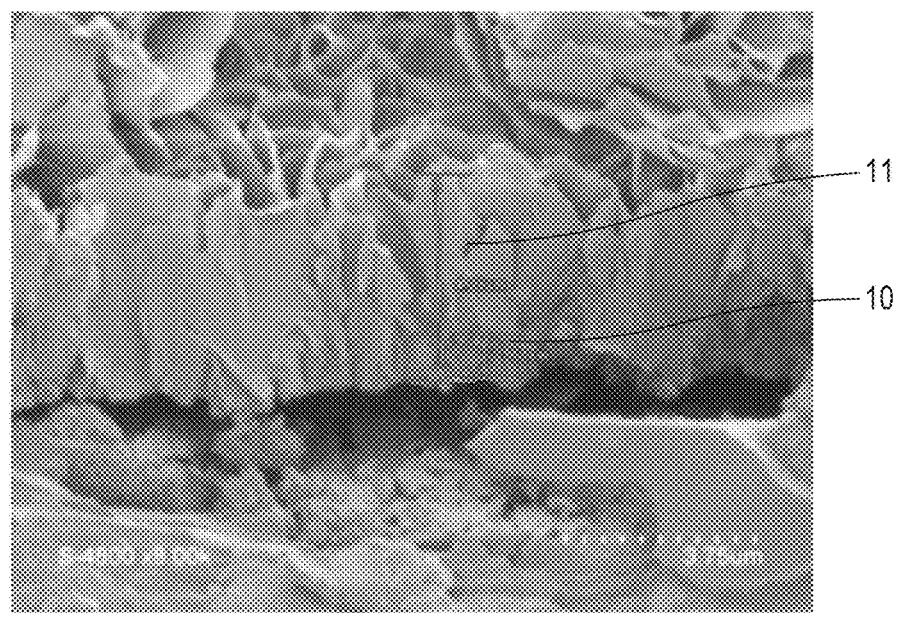
Figure 4:
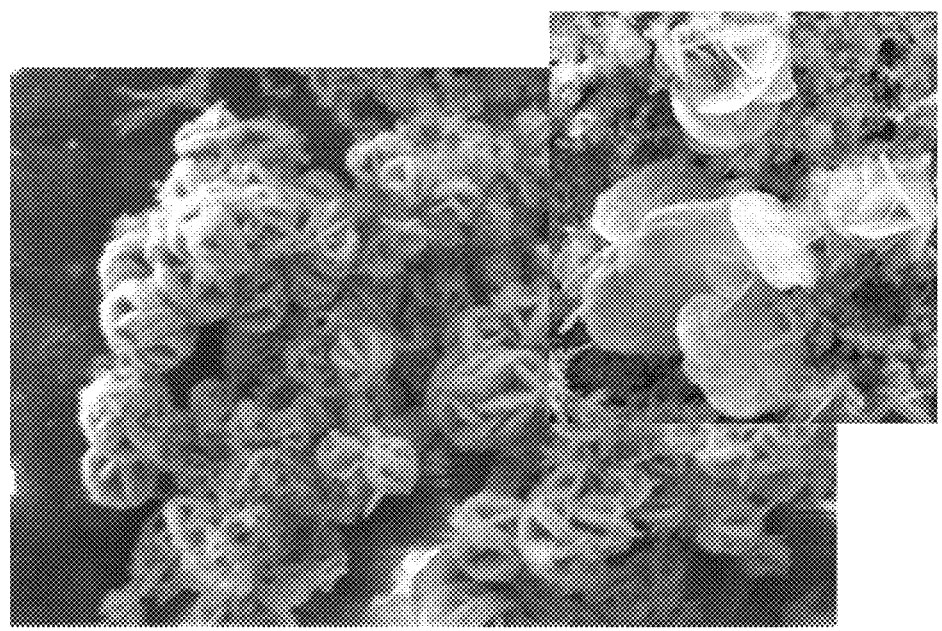
Figure 5:
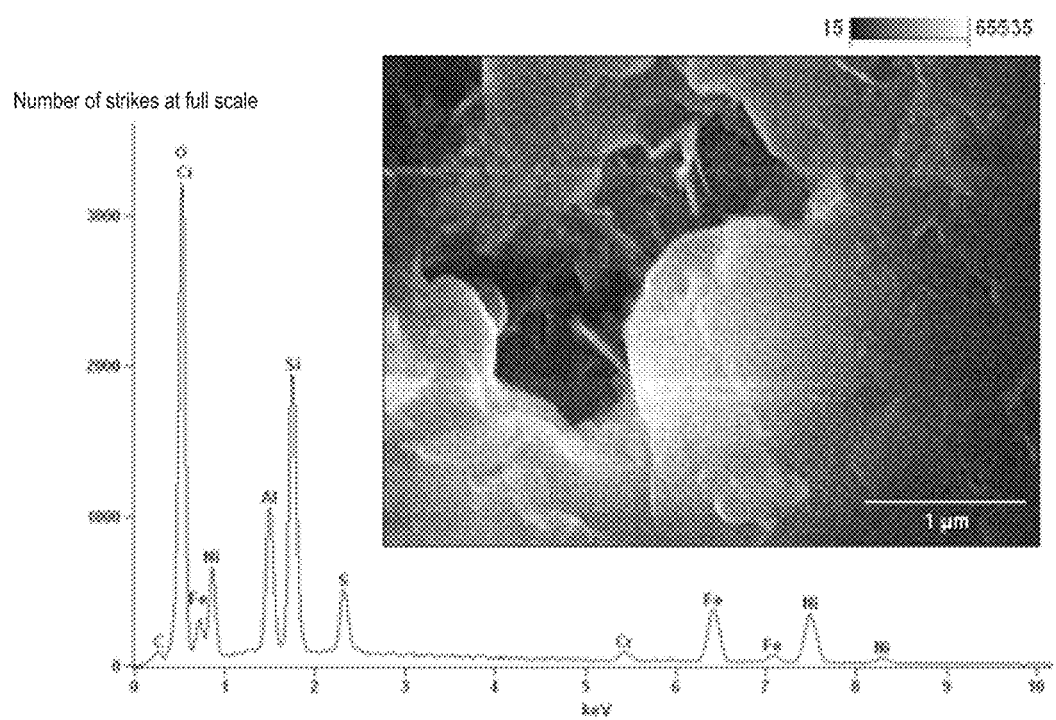

Other features and advantages of the invention will become apparent from the description below, which is given as an example and not restricted to, with reference to the appended figures amongst which include:

FIG. 1 is a schematic cross sectional view of the electrochemical cell of the invention, FIG. 2 is a photograph taken by Scanning Electron Microscope of the aluminosilicate electrolyte after being deposited on the sintered anode, and FIG. 3 is a cross sectional photograph taken by Scanning Electron Microscope of the aluminosilicate electrolyte deposited on the sintered anode, FIG. 4 is a photograph taken by Scanning Electron Microscope showing the silica rosette formation of an anode in a silicate medium, and FIG. 5 is a photograph taken by Scanning Electron Microscope of the nickel electroplating of the cathode on the aluminosilicate electrolyte.

The electrochemical cell of the invention comprises an inorganic electrolyte aluminosilicate which is produced and then deposited by hydrothermal method onto an anode made of sintered metal. The cathode made of a porous electron conductive material is then deposited onto the electrolyte.

With reference to FIG. 1, the electrolyser 1 of the invention includes an anode 2, an aluminosilicate 3 electrolyte, a cathode 4 and a generator 5 which generates a current with a potential difference between the anode 2 and the cathode 4.

The electrolyser 1 also includes means 6 for the introduction of oxidized gaseous compounds under pressure into the cathode compartment 4 and means 7 for introducing pressurized water vapor or liquid into the anode compartment 2.

Water is oxidized at the anode 2, releasing electrons, releasing oxygen and forming $H^+$ ions which migrate through the electrolyte to the surface 3 of the cathode 4 where they are reduced to H° adatomes which react with the gaseous oxidized compounds by forming compounds of hydrocarbons such as methane and ROH alcohols. These H° adatomes can also lead to the formation of hydrogen by pairing at the cathode side 4.

As illustrated in FIG. 1, the electrolyser 1 of the invention may have a tubular shape. This tubular configuration is advantageous as a result of the large exchange surfaces it generates with the gaseous oxidized compounds on the cathode side and the pressurized water on the anode side.

With this tubular configuration, provision can be made for an assembly of tubular electrochemical cells either in series or in parallel on a ferrule which is comparable to the geometry of the heat exchangers.

The electrolyser 1 can also be flat or have any other configuration adapted to its application.

The use of aluminosilicate to achieve the electrolyte 3 has numerous advantages.

Firstly the resulting electrolyser 1 operates at temperatures of between 100 and 400° C. These medium temperatures help limit corrosion of the electrodes.

In addition, the aluminosilicates have good properties of adhesion to metal, which results in the possibility of using a non-noble metal anode.

Moreover, and as will be detailed later, the aluminosilicate may be subject to a deposit on the anode, which results in the ability to use any type of geometric configuration for the anode assembly/electrolyte/cathode, that is to say, the heart of the electrolyser, and thus a general adaptation of the geometrical configuration of the electrolyser for the intended application.

More specifically, the aluminosilicate constituting the electrolyte is a phyllosilicate-type aluminosilicate and/or zeolite.

Both structures have the advantage of having a conductivity which changes according to the water content.

More specifically, the phyllosilicates are made of superimposed laminae formed of layers of $SiO^4$ tetrahedra and octahedra layers $Al(OH)_6$ connected by oxygen atoms and OH-ions which are shared. The presence of $Al^{3+}$ ions instead of $Si^{4+}$ ions induces a negative charge to the network. The negative charge of each lamina is compensated by the charge of intercalary cations such as $Fe^{2+}$, $Al^{3+}$, $Mg^{2+}$, $Mn^{2+}$ or $Ni^{2+}$ which are hydroxylated, or even $H^+$ protons all of which participate in the mobility of protons.

Two particular phyllosilicates are preferentially formed, these are, dickite which belongs to the kaolinite group and clinochlore which belongs to the chlorite group.

Alternatively, the aluminosilicate may be a zeolite which also has a cage structure consisting of $Si^{4+}$ ions and $Al^{3+}$ ions which are connected by O and OH-atoms that are shared.

The anode 2 consists of a sintered stainless alloy comprising at least 18% chromium as well as iron, nickel and/or cobalt.

The use of such materials to produce the anode is advantageous both in terms of corrosion since these alloys corrode very superficially, but also to ensure good adhesion of the aluminosilicate deposit as is detailed further.

The cathode 4 is made of a porous deposit which can be produced using transition metals or metals selected from the Groups IVB, VB, VIB, VIIB, VIIIB, IB, IIB, and their alloys. It is preferable to use transition metal alloys such as nickel and its alloys, cobalt and its alloys or copper alloys. Advantageously, the porous deposit also includes palladium associated with copper which is a good catalyst for carbon dioxide reduction reactions.

Alternatively, the cathode 4 is made of carbon compounds such as carbon nanotubes or graphene, or a coupling of carbon-containing compounds with at least one transition metal or alloy of metals selected from the Groups IVB, VB, VIB, VIIB, VIIIB, IB, IIB, and their alloys.

The following describes a non-restrictive example of the electrolytic production process of the invention.

The manufacture and deposit of aluminosilicate electrolyte on the anode made of sintered metal are performed hydrothermally. Hydrothermally means in an aqueous medium which can be pressurized.

The first step involves the mixing of powders in a de-aerated autoclave. The powder mixture contains at least silica and alumina. Additives for stabilizing the powders and neutralizing the surface of the silica can be added. These additives are selected from alkali metal salts (Na, K, Li, $NH^{4+}$) and alkaline earth metals (Mg, Sr, Ca, Ba).

An alkaline aqueous solution of pH between 8 and 10 is introduced into the autoclave. This basic solution is produced by addition of a base such as ammonia, ethanol amine or morpholine. The alkalinity of the solution facilitates the dissolution of the silica and alumina.

Oxy-carbonaceous complexing compounds such as formaldehyde or carboxylic acids are also introduced into the autoclave. The previous bases ethanolamine, morpholine are also complex-forming agents. These elements promote the complexing of the metal elements constituting the metal anode and even superficial dissolution, thus generating the formation of aluminosilicates of these metal elements, which allows for a good adhesion of the aluminosilicates at the anode. We then observe on cell 1 the presence of a diffusion layer of metal elements constituting the metallic porous anode 2 in the aluminosilicate.

The anode consisting of a sintered stainless alloy is also introduced into the autoclave as previously described. The anode may be coated with an iron layer to promote adhesion of the electrolyte and to increase the thickness of the electrolyte deposition by substitution of aluminum in the aluminosilicate.

An Ag/AgCl type reference electrode is placed in the bottom of the autoclave to measure and control the anode voltage.

The atmosphere of the autoclave is then heated to about 300° C. and the pressure adjusted between 1 and 100 bars. The powders dissolve up to 250° C. and then precipitate at around 300° C. During the dissolution, the aluminum is substituted for silicon by creating a negatively charged crystalline network into which the protons are inserted.

It is possible to improve the densification of the aluminosilicates of the metal elements of the anode and accelerate the production and deposition of aluminosilicates onto the anode electrochemically.

In order to do this, a cathode in the form of a platinum grid is also placed in the autoclave. The electrodes are then polarized in the stability region of water at between −600 and +800 mV/hydrogen electrode, with a potential difference of 600 mV between the anode and the cathode.

In this way, the densification of aluminosilicates on the anode increases. A densification of 90% is targeted. The thickness of this densified layer is optimized according to the desired ohmic drop during use of the electrolyser under pressurized water vapor, or liquid water.

It should be noted that if the anode acts as an electrode both during the manufacture of the electrolyser and in use, the cathode placed in the autoclave only acts as an electrode in the case of the deposition of aluminosilicates on the anode.

The time during which the atmosphere of the autoclave is maintained at 300° C. varies between 1 and 5000 hours. When using the electrochemical method which has just been described, the time at temperature of the atmosphere of the autoclave will be greatly reduced. On the contrary, without using electrochemical means, the time at temperature of 300° C. may be several hundreds of hours up to 5000 hours.

Alternatively, the anode can be first immersed in a sol-gel process prior to the deposition of powder by hydrothermal method as previously described.

The photograph of FIG. 2 shows the deposition of the aluminosilicate electrolytes grafted onto the anode. This deposition was obtained by a mixture of silica and alumina to which additives were added in the form of calcium phosphate and calcium carbonate to stabilize the powders, as well as amines, acetates and formates to improve the adhesion of the aluminosilicates on the anode.

The deposition of powders on the anode is performed at rest potential for many hundreds of hours at a temperature of 250° C.

We see in this figure the alveolar aspect of the aluminosilicate electrolyte.

FIG. 3 shows the aluminosilicate electrolyte 3 in section comprising a dense portion 10 with a thickness of about 0.868 nm in contact with the anode 2, and a portion which is alveolar 11 at rest potential.

The acceleration of the rate of deposition can be obtained by galvanostatic polarization and/or potentiostatic anode from room temperature as shown in FIG. 4 with silica rosette formation on an anode in a silicate medium and by applying a potential difference of 2 volts between the anode and cathode.

After the deposition of the electrolyte 3 has been performed on the anode 2, the assembly is removed from the autoclave and deposition of the cathode 4, described above, is performed on the electrolyte 3.

Four types of depositions on the cathode were tested.
  chemical nickel plating with a Brenner solution ($NiCl_2.6H_2O$ 30 g/l, $NH_4Cl$ 50 g/l and $(NH_4)_2HC_6H_5O_7$ to 65 g/l) followed by an electrolytic deposition of copper or a copper plating with a solution of $SnCl_2$, $CuSO_4$, $5H_2O$, sodium citrate and formaldehyde at pH 3.
  an electrolytic nickel deposition in sulphamate medium (($NH_2SO_3)_2Ni$ 300 g/l $H_3BO_3$ 40 g/l at pH 7 and a temperature of 60° C.) in galvanostatic mode between 0.05 and 100 mA/cm$^2$. This deposition can be followed by an electrolytic deposition of copper in a copper sulphate medium. FIG. 5 thus illustrates the porous nickel deposition obtained by the electroplating on the aluminosilicate layer. The energy-dispersive x-ray spectroscopy (EDX) shown in the same figure, characterizes the presence of nickel from the aluminosilicate layer containing iron from the support.
  deposition under vacuum using an electron gun
  deposition of graphene through the graphene oxide coating subsequently reduced by chemical, electrochemical or physical means.

As mentioned above, the electrolyser of the invention is preferably used at operating temperatures between 100 and 400° C. The electrolyser produces hydrogen by hydrogenation, or reduction of the oxidized compounds such as carbon dioxide in the cathode compartment.

The invention claimed is:
1. An electrochemical cell for the electrolysis of liquid water or water vapor, comprising:
  a porous sintered metal anode,
  an electron conducting porous cathode, and a proton conducting inorganic electrolyte made of aluminosilicate, sandwiched between the porous metal anode and the electron conducting porous cathode, wherein the electrolyte comprises a first layer consisting of aluminosilicate and a second layer which is a diffusion layer comprising aluminosilicates of metal elements diffused from the porous metal anode into the electrolyte.

2. The electrochemical cell according to claim 1, wherein the porous metal anode is a sintered stainless alloy comprising at least 18% chromium.

3. The electrochemical cell according to claim 2, wherein the sintered stainless alloy comprises nickel and/or cobalt and/or iron.

4. The electrochemical cell according to claim 2, wherein the diffusion layer further comprises complexes of the metal elements diffused from the porous metal anode into the aluminosilicate electrolyte, wherein the complexes of the metal elements result from complexing of the metal elements of the porous metal anode with oxycarbonated compounds.

5. The electrochemical cell according to claim 4, wherein the oxycarbonated compounds are selected from formaldehyde, ethanol, carboxylic acids, and mixtures thereof.

6. The electrochemical cell according to claim 1, wherein the porous electron conducting cathode is based on at least one selected from the group consisting of transition metals and metals selected from the group consisting of Groups IVB, VB, VIB, VIIB, VIIIB, IB, and IIB, and their alloys.

7. The electrochemical cell according to claim 6, wherein the porous electron conducting cathode comprises palladium.

8. The electrochemical cell according to claim 1, wherein the porous electron conducting cathode is made up of carbonaceous compounds.

9. An electrochemical cell according to claim 8, wherein the carbonaceous compounds are at least one selected from graphene, carbon nanotubes, and couplings of carbon compounds with at least one selected from the group consisting of transition metals or metals selected from the groups IVB, VB, VIB, VIIB, VIIIB, IB, and IIB, and their alloys.

10. The electrochemical cell according to claim 1, wherein the aluminosilicates are in the form of silicates selected from the group consisting of dickite from the kaolinite group, clinochlore from the chlorite group, and zeolites.

11. The electrochemical cell according to claim 1, which has a tubular configuration.

12. A method of manufacturing an electrochemical cell, the method comprising:
manufacturing an aluminosilicate proton conducting electrolyte and depositing the electrolyte on a porous metal anode by hydrothermal method, and
depositing an electron conducting porous cathode on the electrolyte,
so as to form the electrochemical cell according to claim 1.

13. The method according to claim 12, wherein the manufacturing of the electrolyte and the depositing of the electrolyte on the anode are carried out in an autoclave under a pressure in a range of from 1 to 100 bars and comprises:
mixing powders comprising at least silica and alumina,
introducing an aqueous solution into the autoclave, wherein the solution has basic character and a pH in a range of from 8 to 10 as a result of addition of a base,
introducing the sintered stainless alloy anode in the autoclave,
introducing a noble metal cathode,
increasing autoclave temperature,
polarizing the anode and the noble metal cathode, so as to result in dissolution of the powders and deposition of these powders on the anode accelerated by the polarization.

14. The process according to claim 13, wherein additives selected from the group consisting of alkali metal salts and alkaline earth compounds are added to the mixture of silica and alumina, as well as oxycarbonated compounds.

15. The process according to claim 13, wherein the increase in temperature of the autoclave is carried out until a temperature in a range of from 300° C. to 400° C. is reached and is then maintained for a time in a range of from 1 to 5000 hours.

16. The method according to claim 13, wherein the solution has basic character and a pH in the range of from 8 and 10 as a result of addition of at least one selected from the group consisting of ammonia, ethanol amine and morpholine.

17. The process according to claim 12, wherein the deposition of the electron conducting porous cathode is carried out on the electrolyte by at least one selected from the group consisting of physical deposition, spraying, spray coating, electroplating, and chemical deposition of at least one selected from the group consisting of:
metal compounds selected from the group consisting of transition metals, metals selected from the Groups IVB, VB, VIB, VIIB, VIIIB, IB, and IIB, and their alloys, followed by an electrolytic or chemical deposition of copper, and
carbon compounds.

18. The process according to claim 17, wherein the cathode is deposited on the electrolyte by at least one selected from the group consisting of physical deposition, spraying, spray coating, electroplating, and chemical deposition of carbon compounds selected from the group consisting of graphene, carbon nanotubes, and couplings of carbon-containing compounds with at least one metal compound selected from the group consisting of transition metals and alloy metals selected from the groups IVB, VB, VIB, VIIB, VIIIB, IB, and IIB, and their alloys.

19. The process according to claim 18, wherein the cathode is deposited on the electrolyte by coating graphene oxide coating which is subsequently reduced chemically, electrochemically or physically.

20. The process according to claim 12, wherein the deposition of the electrolyte is performed hydrothermally.

21. A method of reducing oxidized compounds, by reactive chemical species formed by the electrolysis of water, comprising:
carrying out a reduction in the cathode compartment of the electrochemical cell according to claim 1, at temperatures in a range of from 100 to 400° C.,
so as to obtain at least one selected from the group consisting of
(i) production of hydrogen in the cathode compartment, and
(ii) oxidation of reduced compounds in the anode compartment.

* * * * *